No. 673,050. Patented Apr. 30, 1901.
R. FLESSA.
PROCESS OF PRODUCING COLORING MALT.
(Application filed Dec. 5, 1900.)
(No Model.)
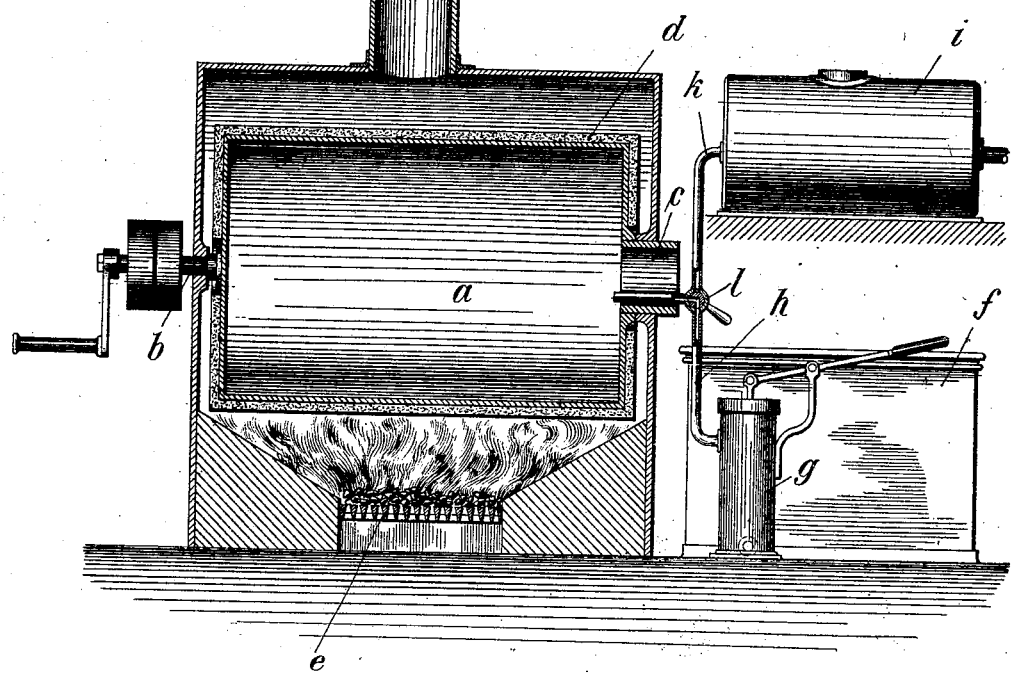
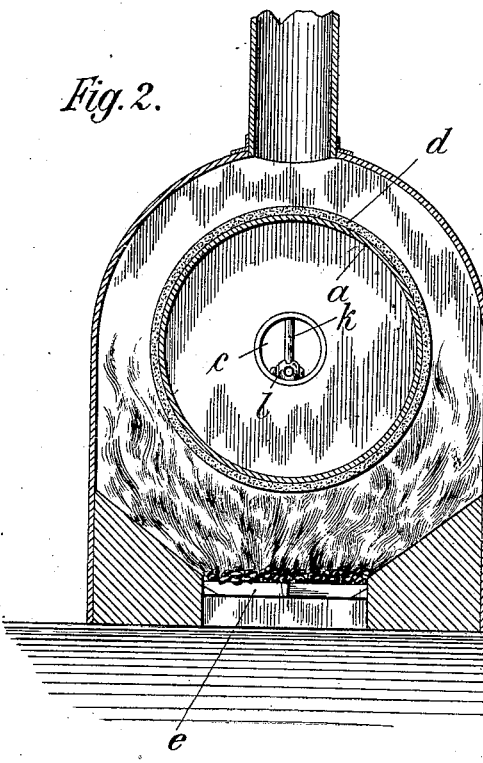

UNITED STATES PATENT OFFICE.

RUDOLF FLESSA, OF FLORIDSDORF II, NEAR VIENNA, AUSTRIA-HUNGARY.

PROCESS OF PRODUCING COLORING-MALT.

SPECIFICATION forming part of Letters Patent No. 673,050, dated April 30, 1901.

Application filed December 5, 1900. Serial No. 38,741. (No specimens.)

*To all whom it may concern:*

Be it known that I, RUDOLF FLESSA, a subject of the Emperor of Austria-Hungary, residing at Floridsdorf II, near Vienna, in the Empire of Austria-Hungary, have invented certain new and useful Improvements in Processes for Producing Coloring-Malt, (for which I have applied for patents in Germany, dated March 5, 1900; in Austria, dated November 5, 1900, and in England, dated November 6, 1900,) of which the following is a specification.

In the ordinary processes for making coloring-malt for brewing it was absolutely necessary when roasting the malt to avoid comparatively high degrees of temperature, which if too high gave a bitter taste to the roasted product. In consequence of this coloring-malt could only be produced in comparatively small quantities, in which, moreover, there only existed a small amount of the coloring extract from the malt. These drawbacks are obviated in the present invention, inasmuch as the process does not allow the substances to be roasted to come into direct contact with the hot air in the apparatus, and especially not with the highly-heated walls. This is attained by adding glycerin to the roasted products. In consequence of this addition the temperature can be raised to about 200° to 240° centigrade, which causes an increased formation of coloring extract and also enables it to be manufactured on a large scale. The coloring-malt produced thereby is free from all substances having a bitter burned taste and has a pleasant flavor suitable for use in the preparation of dark beers. In the German work, *Berichte über Lebensmittel*, (Reports of Food Products,) 1896, pages 340 and 350, processes are described for the application of glycerin in roasting coffee and substitutes for coffee. This is intended to produce a protecting layer on the bean in order to improve its appearance and protect it from atmospheric influence. In these processes obviously only moderate temperatures for the roasting process can be used. In the present process the malt is roasted at a very high temperature during a prolonged period of time, which causes not only the surface to be affected by the glycerin, but also increases the formation of the coloring extract.

In carrying out my process I make use of any suitable apparatus, such as that illustrated in the accompanying drawings, in which—

Figure 1 is a vertical and longitudinal section, and Fig. 2 a cross-section.

The apparatus consists of a drum or cylinder $a$, which is mounted on the shaft $b$ at the one end and tube $c$ at the other end. This cylinder may be coated on the outside with a layer of asbestos $d$.

$e$ is a grate on which coke or other fuel is burned.

The glycerin is contained in the vessel $f$, on the side of which a force-pump $g$ is provided, by means of which the glycerin is forced through the pipe $h$, controlled by the valve $l$, into the drum $a$.

The apparatus may be heated by any other means, such as gas or hot air. In the drawings provision is made for driving the drum either by hand or by power. The most suitable speed is about sixty revolutions per minute.

In carrying out the process, to about one hundred kilograms of kiln-dried malt in roasting-drum $a$ are added five to eight kilograms of glycerin, either by itself or mixed with any suitable quantity of water or steam, which may be admitted from a boiler $i$ through the pipe $k$. This glycerin or mixture of glycerin and water or steam is added at three different times, the first portion being let into the drum at the commencement of the process. The temperature is first raised to 160° centigrade, whereupon the second portion of the glycerin or mixture of glycerin and water or steam is added. At this stage samples are taken repeatedly and the temperature raised to 200° centigrade. The grain changes color at this stage from a light to a dark brown. When the temperature of 200° centigrade has been attained, the third portion of glycerin is added and the temperature raised to 220°, 230°, or 240° centigrade, according to the shade of color desired. Samples must also be frequently taken at this stage of the process to avoid continuing the roasting too long. When a uniform brown-black color has been attained, the process can be terminated. By the time the roasting process is completed the glycerin will have completely disappeared.

In order to remove any possible trace from the roasted product, however, it is preferable to pass steam or water through the drum.

What I claim, and desire to secure by Letters Patent of the United States, is—

The herein-described method of producing coloring-malt which consists in adding glycerin, alone or combined with water or steam, to the malt, and increasing the roasting temperature to a high degree, whereby the glycerin is finally removed or decomposed, substantially as and for the purposes described.

In testimony whereof I have hereunto set my hand in the presence of two witnesses.

RUDOLF FLESSA.

Witnesses:
 C. B. HURST,
 KARL HAINZL.